(12) United States Patent
Sasaki et al.

(10) Patent No.: US 10,379,529 B2
(45) Date of Patent: Aug. 13, 2019

(54) DATA PROCESSING DEVICE AND DATA PROCESSING METHOD

(71) Applicant: Yokogawa Electric Corporation, Musashino-shi, Tokyo (JP)

(72) Inventors: Takashi Sasaki, Tokyo (JP); Hiroyuki Miyamoto, Tokyo (JP); Atsushi Toyoda, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 29 days.

(21) Appl. No.: 15/862,195

(22) Filed: Jan. 4, 2018

(65) Prior Publication Data

US 2018/0196414 A1 Jul. 12, 2018

(30) Foreign Application Priority Data

Jan. 11, 2017 (JP) .................................. 2017-002451

(51) Int. Cl.
*G05B 23/02* (2006.01)
*G05B 19/042* (2006.01)
(Continued)

(52) U.S. Cl.
CPC .......... *G05B 23/0202* (2013.01); *G05B 11/01* (2013.01); *G05B 13/0245* (2013.01);
(Continued)

(58) Field of Classification Search
CPC .. G05B 11/00; G05B 19/042; G05B 19/0425; G05B 23/0202; G05B 23/0272; G06F 3/02
See application file for complete search history.

(56) References Cited

U.S. PATENT DOCUMENTS 4,974,221 A * 11/1990 Hosoya ................ G11B 7/0033
369/44.32
8,553,901 B2 * 10/2013 Hersbach ............. H04R 25/453
381/71.6
(Continued)

OTHER PUBLICATIONS

Fumiaki Uozumi, et al., "Fictitious Reference Iterative Tuning of Disturbance Observers for Attenuation of the Effect of Periodic Unknown Exogenous Signals", 11th IFAC (International Federation of Automatic Control) International Workshop on Adaptation and Learning in Control and Signal Processing, 2013, pp. 576-581. Cited in Specification beginning on p. 19.

*Primary Examiner* — Crystal J Barnes-Bullock
(74) *Attorney, Agent, or Firm* — Sughrue Mion, PLLC

(57) ABSTRACT

A data processing device according to one aspect of the present invention includes a first definer configured to define a transfer function of a process which is a control target on the basis of an output value from the process and a manipulated variable of the process, an analyzer configured to analyze frequency characteristics of the output value from the process, a second definer configured to define a target sensitivity function on the basis of a sensitivity function, a first frequency band included in the frequency characteristics, and a predetermined attenuation factor, the sensitivity function being defined based on the transfer function of the process and at least one control parameter of a controller for controlling the process, and an adjuster configured to adjust the at least one control parameter to decrease a difference between the sensitivity function and the target sensitivity function.

13 Claims, 9 Drawing Sheets

(51) Int. Cl.
*G05B 11/01* (2006.01)
*G05B 13/02* (2006.01)
*G06F 3/02* (2006.01)

(52) U.S. Cl.
CPC ..... *G05B 19/0425* (2013.01); *G05B 23/0272* (2013.01); *G05B 19/042* (2013.01); *G05B 2219/23067* (2013.01); *G06F 3/02* (2013.01)

(56) References Cited

U.S. PATENT DOCUMENTS

| | | | |
|---|---|---|---|
| 9,601,133 B2 * | 3/2017 | Taenzer | H04R 3/005 |
| 9,761,243 B2 * | 9/2017 | Taenzer | H04R 3/005 |
| 9,936,304 B2 * | 4/2018 | Bach | H04R 3/06 |

* cited by examiner

DATA PROCESSING DEVICE AND DATA PROCESSING METHOD

BACKGROUND OF THE INVENTION

Field of the Invention

The present invention relates to a data processing device and a data processing method.

The present application claims priority based on Japanese patent application 2017-2451, filed on Jan. 11, 2017 and includes herein by reference the content thereof.

Description of Related Art

In the related art, a distributed control system (DCS) that continuously controls a manufacturing process has been proposed. The DCS receives a measured value indicating a manufacturing process state from a sensor via a converter, and performs a feedback control operation on a difference between a set value which is set to be in a desirable state in operation and the measured value for every predetermined sampling period (normally one second). Then, the DCS inputs an acquired manipulated variable into an actuator via the converter. Examples of a state quantity include a flow rate, a pressure, and a concentration. The actuator is a machine element that converts input energy into physical motion, such as a valve, a pump, and a motor. The actuator operates on the basis of the input manipulated variable. Accordingly, a control loop is formed via the sensor and the actuator. In general, the DCS includes a plurality of control loops. There are some cases in which the number of control loops in one manufacturing plant is several thousand or more.

Signals (such as a measured value, a set value, and a manipulated variable) for each sampling period (normally one second) in the control loops of the DCS are referred to as real-time data. The real-time data is used in the following applications for operation monitoring.

Continuous control of a plant such as PID control

Operation monitoring on a trend screen and alarming at the time of manual adjustment and occurrence of an abnormality of facilities (for example, abnormality of upper and lower limits) based thereon.

SUMMARY OF THE INVENTION

There are few cases in which the real-time data is accumulated for a long time and is used for the purpose of improvement in quality or production efficiency based on analysis of controllability or improvement of a control parameter. For example, there are some cases in which retuning of a control parameter to more appropriate values due to a change in production plans or facilities is not performed, but a control parameter having an initial value which was initially set at the time of installation in a system is used. Accordingly, there are some cases in which product quality or production efficiency decreases and such a state goes unattended.

Main reasons for this are, for example, as follows.

The number of control loops in a DCS is generally two or more for a single process and is several thousand in some cases. There are some cases in which sufficient time for adjusting such control loops to optimal values is not given to an operator or a maintenance engineer.

A plurality of continuous processes generally interfere with each other. Accordingly, there are some cases in which even if a variation in processes is displayed on a trend screen, an operator who views the screen has difficulty identifying a control loop that is the main reason for the variation.

Even when the control loop that is the main reason is identified, temporary stop of control and process identification are generally performed to optimize a control parameter. In the process identification, generally, a step response test is performed to obtain a process model for deriving a control parameter. In this method, since a loss in production is caused, it is not practical to frequently perform the step response test on many control loops.

In a process in which many control loops interfere with each other, there are some cases in which a period variation of an output value occurs due to disturbances and the periodic variation that occurs propagates to neighboring control loops. A change of a set value causes the disturbance. In a control system in which such a periodic variation occurs, a practical technique for optimizing a control parameter has not been proposed.

One aspect of the invention provides a control device and a control method that adjusts at least one control parameter to an optimal value using real-time data which is acquired during operation without applying a load to a process.

A data processing device according to a first aspect of the present invention may include a first definer configured to define a transfer function of a process which is a control target on the basis of an output value from the process and a manipulated variable of the process, an analyzer configured to analyze frequency characteristics of the output value from the process, a second definer configured to define a target sensitivity function on the basis of a sensitivity function, a first frequency band included in the frequency characteristics, and a predetermined attenuation factor, the sensitivity function being defined based on the transfer function of the process and at least one control parameter of a controller for controlling the process, and an adjuster configured to adjust the at least one control parameter to decrease a difference between the sensitivity function and the target sensitivity function.

In the above-described data processing device, the second definer may be configured to specify a frequency band in which a gain is greater than gains in other frequency bands as the first frequency band and define the target sensitivity function, the gain of the target sensitivity function in the specified first frequency band being less than the gain of the sensitivity function.

In the above-described data processing device, the second definer may be configured to define an attenuation factor function indicating an attenuation factor of the gain for each frequency on the basis of a center frequency of the first frequency band in which the gain is attenuated, an attenuation factor of the gain at the center frequency, and a bandwidth of the first frequency band, and multiply the sensitivity function by the attenuation factor function to define the target sensitivity function.

In the above-described data processing device, the second definer may be configured to define the target sensitivity function, the gain of the target sensitivity function in the specified first frequency band being less than the gain of the sensitivity function, when the second definer determines that a center frequency of the specified first frequency band is higher than a predetermined frequency.

In the above-described data processing device, the second definer may be configured to define the target sensitivity function, the gain of the target sensitivity function in a low frequency band being less than the gain of the sensitivity function, the low frequency band being lower than a predetermined second frequency, when the gain in the low frequency band is greater than a predetermined gain.

In the above-described data processing device, the second definer may be configured to define an attenuation factor function indicating an attenuation factor of the gain for each frequency on the basis of the gain at 0 [rad/s] and a start frequency which is the predetermined second frequency and multiply the sensitivity function by the attenuation factor function to define the target sensitivity function.

A data processing device according to a second aspect of the present invention may include a first definer configured to define a transfer function of a process which is a control target on the basis of an output value from the process and a manipulated variable of the process, an analyzer configured to analyze frequency characteristics of a sensitivity function defined based on a transfer function of the process and at least one control parameter of a controller for controlling the process, a second definer configured to define a target sensitivity function on the basis of the sensitivity function, a first frequency band included in the frequency characteristics, and a predetermined attenuation factor, and an adjuster configured to adjust the at least one control parameter to decrease a difference between the sensitivity function and the target sensitivity function.

A data processing method according to a second aspect of the present invention may include defining a transfer function of a process which is a control target on the basis of an output value from the process and a manipulated variable of the process, analyzing frequency characteristics of the output value from the process or frequency characteristics of a sensitivity function defined based on the transfer function of the process and at least one control parameter of a controller for controlling the process, defining a target sensitivity function on the basis of the sensitivity function, a first frequency band included in the frequency characteristics, and a predetermined attenuation factor, and adjusting the at least one control parameter to decrease a difference between the sensitivity function and the target sensitivity function.

In the above-described data processing device, defining the target sensitivity function may include specifying a frequency band in which a gain is greater than gains in other frequency bands as the first frequency band, and defining the target sensitivity function, the gain of the target sensitivity function in the specified first frequency band being less than the gain of the sensitivity function.

In the above-described data processing device, defining the target sensitivity function may include defining an attenuation factor function indicating an attenuation factor of the gain for each frequency on the basis of a center frequency of the first frequency band in which the gain is attenuated, an attenuation factor of the gain at the center frequency, and a bandwidth of the first frequency band, and multiplying the sensitivity function by the attenuation factor function to define the target sensitivity function.

In the above-described data processing device, defining the target sensitivity function may include defining the target sensitivity function, the gain of the target sensitivity function in the specified first frequency band being less than the gain of the sensitivity function, when the second definer determines that a center frequency of the specified first frequency band is higher than a predetermined frequency.

In the above-described data processing device, defining the target sensitivity function may include defining the target sensitivity function, the gain of the target sensitivity function in a low frequency band being less than the gain of the sensitivity function, the low frequency band being lower than a predetermined second frequency, when the gain in the low frequency band is greater than a predetermined gain.

In the above-described data processing device, defining the target sensitivity function may include defining an attenuation factor function indicating an attenuation factor of the gain for each frequency on the basis of the gain at 0 [rad/s] and a start frequency which is the predetermined second frequency, and multiplying the sensitivity function by the attenuation factor function to define the target sensitivity function.

According to the one aspect of the invention, it is possible to adjust at least one control parameter to an optimal value using real-time data which is acquired during operation without applying a load to a process.

DETAILED DESCRIPTION OF THE INVENTION

Hereinafter, a data processing device and a data processing method according to an embodiment of the invention will be described with reference to the accompanying drawings.

(Data Processing System)

An example of a configuration of a data processing system according to an embodiment of the invention will be described.

Figure 1:
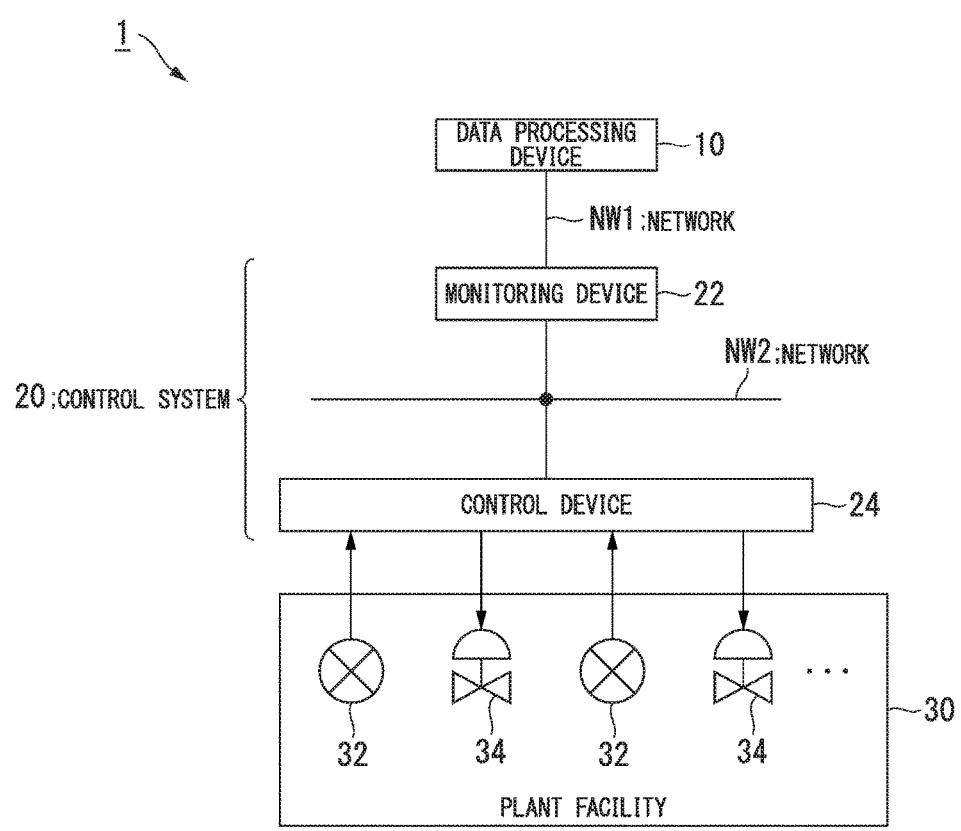
FIG. 1 is a block diagram showing an example of a configuration of a data processing system according to an embodiment of the invention.

FIG. 1 is a block diagram showing an example of a configuration of a data processing system according to the embodiment.

A data processing system 1 includes, for example, a data processing device 10 and a control system 20.

The data processing device 10 receives process data from a control device 24 via a network NW2, a monitoring device 22, and a network NW1 every predetermined time (for example, one second). Process data is real-time data which includes output information indicating a measured value of an operation state of a process in a plant facility 30. The process data may include setting information indicating a set value serving as a control target of the process and input information indicating a manipulated variable on the process. The data processing device 10 accumulates the received process data. The data processing device 10 analyzes the accumulated process data and specifies a main variation component of the process. The data processing device 10 optimizes at least one control parameter for a control loop including the specified variation component. The data processing device 10 calculates a transfer function on the basis of the measured value and the manipulated variable and further analyzes frequency characteristics of the measured value in the process. The data processing device 10 defines target sensitivity function on the basis of the transfer function and the frequency characteristics and adjusts the control parameter such that a difference between a current sensitivity function based on the control parameter before adjustment and the target sensitivity function decreases.

The control system 20 controls an operation state of a process which is a control target in the plant facility 30. The control system 20 is a distributed control system (DCS) including, for example, a monitoring device 22 and a control device 24. The data processing device 10 and the monitoring device 22 are connected to each other via the network NW1 and can transmit and receive data to and from each other. The monitoring device 22 and the control device 24 are connected via the network NW2 and can transmit and receive data to and from each other. In the example shown in FIG. 1, the network NW1 is not directly connected to the network NW2. This is to prevent illegal access to the control device 24 connected to the network NW2.

The monitoring device 22 is a human-machine interface (HMI) that is used for an operator of the plant facility 30 to monitor operation states of processes or to set a set value for controlling the operation state. The monitoring device 22 receives output information indicating a measured value of the operation state in the plant facility 30 every predetermined time. For example, the monitoring device 22 includes a display unit that displays the measured value at each time. The monitoring device 22 includes an operation input unit that sets a set value as a control target in response to an operation thereof. The monitoring device 22 transmits setting information indicating the set value to the control device 24 and the data processing device 10.

The control device 24 controls an operation state of a process on the basis of output information of the process which is input from the plant facility 30 every predetermined time and setting information received from the monitoring device 22. The control device 24 includes a controller for each process serving as a control target. The controller is, for example, a PID controller that performs PID control. PID control is a technique of calculating a sum of a proportional term P, an integration term I, and a derivative term D as a manipulated variable and inputting the acquired manipulated variable to a control target. The proportional term P is acquired by multiplying a predetermined proportional gain $K_P$ by a difference which is obtained by subtracting a measured value indicated by the output information from a set value indicated by the setting information at that time. The integration term I is acquired by multiplying a predetermined integration gain $K_I$ by an integrated value which is obtained by integrating a difference up to that time. The derivative term D is acquired by multiplying a predetermined derivative gain $K_D$ by a derivative value which is obtained by differentiating a difference at that time. The proportional gain $K_P$, the integration gain $K_I$, and the derivative gain $K_D$ correspond to control parameters of the PID control. The control device 24 outputs the manipulated variable acquired for each process to the plant facility 30. The control device 24 transmits the output information input from each process to the data processing device 10.

The plant facility 30 is a facility having a process which is a control target. Such a process is a continuous process in which an operation is continuously performed with time. The plant facility 30 includes a sensor 32 and an actuator 34 for each process which is a control target. The sensor 32 detects an operation state of a process. Examples of the sensor 32 include a temperature sensor that detects a temperature, a pressure sensor that detects a pressure, a flowmeter that detects a flow rate, a current meter that detects a current, and a voltage meter that detects a voltage and detects a state which is changed by the operation of the actuator 34. The sensor 32 sequentially outputs output information indicating the detected state to the control device 24.

The actuator 34 operates on the basis of the input information input from the control device 24. The operation state of the process is changed due to the operation. As an input value indicated by the input information increases, an operation amount of the actuator 34 increases. For example, the operation amount of the actuator 34 is proportional to the input value. Accordingly, one control loop is formed by a set of the sensor 32, the controller in the control device 24, and the actuator 34. Examples of the actuator include a pump, a compressor, a valve, a motor, and a motor driver.

In the following description, a configuration and a process associated with a single control loop will be mainly described, but the number of control loops is generally two or more. In this case, processes associated with the individual control loops can be performed in parallel.

(Data Processing Device)

An example of a configuration of the data processing device according to this embodiment will be described below.

Figure 2:
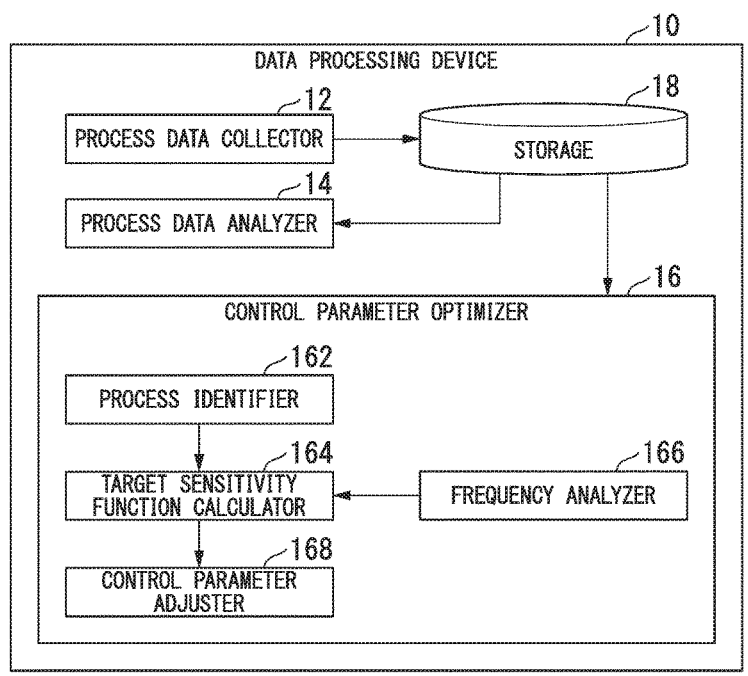
FIG. 2 is a block diagram showing an example of a configuration of a data processing device according to the embodiment.

FIG. 2 is a block diagram showing an example of a configuration of the data processing device 10 according to this embodiment.

The data processing device 10 includes, for example, a process data collector 12, a process data analyzer 14, a control parameter optimizer 16, and a storage 18. The control parameter optimizer 16 includes, for example, a process identifier 162, a target sensitivity function calculator 164, a frequency analyzer 166, and a control parameter adjuster 168. The data processing device 10 may be embodied by a computer (not shown) including an operation input unit such as a keyboard and a pointing device, a display unit such as a liquid crystal display (LCD), a data input and output unit such as an input and output interface and a communication interface, an arithmetic operation circuit such as a central processing unit (CPU), and a storage medium such as a random access memory (RAM) and a read-only memory (ROM). In this case, the arithmetic operation circuit embodies functions of the above-mentioned units by reading a control program which has been stored in the storage medium in advance and performing processes instructed by commands described in the control program at the time of starting.

The process data collector 12 receives process data from the control system 20 (FIG. 1). The process data collector 12 receives output information of each process and input information to the process as a part of the process data from the control device 24 (FIG. 1) via the monitoring device 22 (FIG. 1) every predetermined time. The process data collector 12 receives setting information indicating a set value at that time from the monitoring device 22 as another part of the process data. The data processing device 10 uses, for example, an object linking and embedding for process control (OPC) which is a regular standard of process data communication to collect the process data. Since data formats of respective data are unified, the data processing device 10 can use data received from the devices for the OPC in a predetermined order without depending on a maker or an internal configuration of the monitoring device 22 or the control device 24.

The process data collector 12 stores the measured value indicated by the output information received every predetermined time, the manipulated variable indicated by the input information, and the set value indicated by the setting information in the storage 18 for each process. The process data includes the set value, the measured value, and the manipulated variable at each time of the process in which closed loop control is performed. The storage medium has a capacity that can store process data over a sufficiently long period of time which is permitted by a storage capacity.

The process data analyzer 14 analyzes the process data stored in the storage 18. For example, the process data analyzer 14 analyzes a causal relationship between a plurality of processes in each time series of the measured values, the amounts of operation, and the set values constituting the process data and specifies variation components or causes thereof. For example, the process data analyzer 14 may specify a process having a largest amount of variation components or may specify a process in which variation of the variation component is started earliest. The process data analyzer 14 uses a technique such as correlation analysis which is a linear analysis technique, frequency analysis, or main component analysis. The process data analyzer 14 may store the variation component acquired by analysis in the storage 18 or may display the variation component on a display unit (not shown).

The control parameter optimizer 16 optimizes at least one control parameter for a control loop associated with a predetermined process using the process data stored in the storage 18. In this embodiment, optimization is not absolutely limited to calculation of a most appropriate control parameter, but means that a value of an evaluation function which will be described later is calculated to become less as a whole. The optimization may include a case in which the value of the evaluation function increases temporarily. For example, the control parameter optimizer 16 may employ a process specified by the process data analyzer 14 or a process having a specified variation component as a process which is a processing target.

The storage 18 stores data which is used for a process by the units of the data processing device 10 or data which is acquired by processing. The process data which has been collected by the process data collector 12 every predetermined time is accumulated in the storage 18 for each process. The process data to be processed by the process data analyzer 14 and the control parameter optimizer 16 may be past data which was stored in the storage 18 in advance or may be real-time data which is newly sequentially stored in the storage.

An example of the configuration of the control parameter optimizer 16 will be described below.

The control parameter optimizer 16 includes, for example, the process identifier 162 (first definer), the target sensitivity function calculator 164 (second definer), the frequency analyzer 166 (analyzer), and the control parameter adjuster 168 (adjuster).

Figure 3:
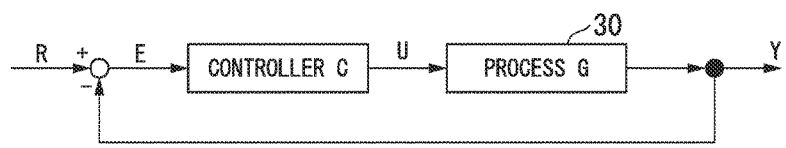
FIG. 3 is a block diagram showing an example of a control loop according to the embodiment.
Figure 4:
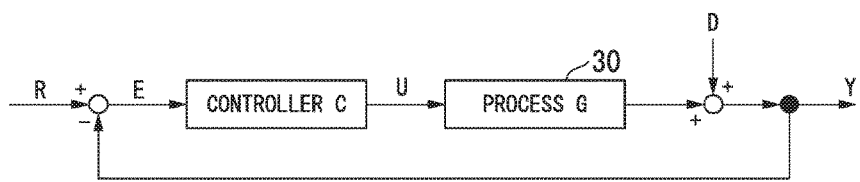
FIG. 4 is a block diagram showing another example of a control loop according to the embodiment.

The process identifier 162 identifies (defines) a transfer function of a predetermined process indicated by the process data collected by the process data collector 12 on the basis of the set value, the measured value, and the manipulated variable of the process. In the embodiment, defining the transfer function indicates calculating at least one parameter included in the transfer function having a predetermined order. In general, even while closed loop control is being performed, the transfer function of the process can be defined using the process data including a section which includes a time point at which a difference of the measured value from the set value is significantly changed. The significant change refers to, for example, a change of which the degree is greater than a predetermined change threshold value. For example, a value sufficiently greater than an error is set as the change threshold value. Examples of the time point at which the difference is significantly changed include a time point at which the set value is changed (FIG. 3) and a time point at which a disturbance is added to an output of the process (FIG. 4).

The process identifier 162 calculates a parameter to which the transfer function G of the process is applied such that a square norm of errors v(t) indicated by Equation (1) decreases, for example, using a least square method.

$$v(t) = y_{meas}(t) - y_{model}(t) \tag{1}$$

In Equation (1), $y_{meas}(t)$ denotes an output value, that is, a measured value, which is actually output from the process. $y_{model}(t)$ denotes a model output value which is obtained by multiplying the transfer function G of the process by an input value u(t) to the process which is output from control device 24 as expressed by Equation (2).

$$y_{model}(t) = Gu(t) \tag{2}$$

The order and a waste time (a delay element) of the transfer function G of the process is set in advance. The process identifier 162 outputs transfer function information indicating a parameter of the transfer function G of the identified process to the target sensitivity function calculator 164.

The target sensitivity function calculator 164 defines a sensitivity function $S(\theta)$ in a current process from the transfer function G of the process expressed by the parameter which is indicated by the transfer function information input from the process identifier 162. The sensitivity function $S(\theta)$ is a function indicating a degree of contribution or attenuation of a disturbance D to the measured value Y. The sensitivity function $S(\theta)$ corresponds to a reciprocal of a value which is obtained by adding 1 to a value acquired by multiplying a transfer function $C(\theta)$ of a controller as a control target in the control device 24 by the transfer function G as expressed by Equation (3). $\theta$ denotes a set of control parameters which are used for a controller associated with the process to calculate a manipulated variable.

$$S(\theta) = \frac{1}{1 + G \cdot C(\theta)} \tag{3}$$

Then, the target sensitivity calculator 164 defines an attenuation factor function $S_d$ on the basis of frequency component information input from the frequency analyzer 166. The frequency component information is information indicating a main frequency component (a main component) of the measured value Y. The target sensitivity function calculator 164 determines whether frequency characteristics indicated by the frequency component information include peak characteristics as the main component. For example, when the frequency component information includes information indicating a center frequency c of a frequency band of which a gain is larger than gains of the other frequency bands, the target sensitivity function calculator 164 determines that the frequency characteristics include peak characteristics as the main component. When the center frequency c is equal to or higher than a predetermined frequency (for example, 0.1 [rad/s]), the target sensitivity function calculator 164 determines that the frequency characteristics include peak characteristics as the main component. When it is determined that the frequency characteristics include peak characteristics, the target sensitivity function calculator 164 defines the attenuation factor function $S_d$ that gives a predetermined attenuation factor M (for example, 5 dB) at the center frequency c. The attenuation factor function $S_d$ decreases a gain for the disturbance D in the frequency band centered on the center frequency c. When the frequency component information additionally includes information indicating an attenuation factor M, the target sensitivity function calculator 164 may employ the attenuation factor M. When the frequency component information additionally includes information indicating a unilateral bandwidth r, the target sensitivity function calculator 164 may define the attenuation factor function $S_d$ such that a unilateral bandwidth of a frequency band in which the attenuation factor is equal to or greater than a predetermined attenuation factor (for example, 3 dB) with respect to the center frequency c becomes r.

The target sensitivity function calculator 164 may determine whether the main component is in a low frequency band which is lower than a predetermined frequency on the basis of the frequency component information. For example, when the center frequency c is lower than a predetermined frequency, the target sensitivity function calculator 164 determines that the main component is in a low frequency band. When it is determined that the main component is in a low frequency band, the target sensitivity function calculator 164 defines the attenuation factor function $S_d$ that gives a predetermined attenuation factor M at a frequency (for example, 0 [rad/s]) which is sufficiently lower than the predetermined frequency. The attenuation factor function $S_d$ decreases the gain for a disturbance D in a frequency band which is a low frequency band lower than the predetermined frequency. When the frequency component information includes information of a start frequency $w_1$ which is the predetermined frequency, the attenuation factor function $S_d$ in which the attenuation factor in a low frequency band lower than the start frequency $w_1$ is equal to or greater than M may be determined. An example of the attenuation factor function $S_d$ will be described later.

The target sensitivity function calculator 164 defines a target sensitivity function $S_R$ by multiplying an initial sensitivity function $S(\theta_{ini})$ by the attenuation factor function $S_d$ as expressed by Equation (4). $\theta_{ini}$ represents an initial value of a control parameter of a controller. Accordingly, the target sensitivity function calculator 164 outputs the calculated target sensitivity function $S_R$ to the control parameter adjuster 168.

$$S_R = S(\theta_{ini}) \cdot S_d \tag{4}$$

The frequency analyzer 166 analyzes the frequency characteristics of the output value Y which is output from the process on the basis of the process data stored in the storage 18 and determines a main component thereof. The frequency analyzer 166 outputs the frequency component information indicating the determined main component to the target sensitivity function calculator 164. The frequency analyzer 166 may determine a main component of the initial sensitivity function $S(\theta_{ini})$ and output the frequency component information indicating the main component.

The target sensitivity function $S_R$ from the target sensitivity function calculator 164, the transfer function G of the process from the process identifier 162, and process data in which a set of the set value R and the measured value Y is accumulated from the storage 18 are input to the control parameter adjuster 168. The control parameter adjuster 168 adjusts the control parameter θ, for example, using a fictitious reference iterative tuning (FRIT) algorithm as will be described below. The control parameter adjuster 168 calculates a virtual disturbance $D_{est}(\theta)$ from the transfer function G of the process, the transfer function $C(\theta)$ of the controller, and the process data of the set value R and the measured value Y as expressed by Equation (5).

$$D_{est}(\theta) = (1 + G \cdot C(\theta))Y - G \cdot C(\theta)R \tag{5}$$

The control parameter adjuster 168 calculates a control parameter $\theta_0$ such that a following evaluation function $J(\theta)$ which is calculated from the virtual disturbance $D_{est}(\theta)$ is minimized. More specifically, the control parameter adjuster 168 calculates the control parameter $\theta_0$ such that the evaluation function $J(\theta_0)$ indicating a magnitude of a difference is smaller than the evaluation function $J(\theta)$ acquired from the control parameter θ before adjustment.

$$J(\theta) = \|Y - (1 - S_R)R - S_R \cdot D_{est}(\theta)\|^2 \tag{6}$$

The evaluation function $J(\theta)$ can be modified as follows.

$$J(\theta) = \left\| \left[1 - \frac{S_R}{S(\theta)}\right](Y - R) \right\|^2 \tag{7}$$

Equation (7) means that the control parameter θ is adjusted (optimized) such that the magnitude of the difference between the sensitivity function $S(\theta)$ given by the control parameter θ and the target sensitivity function $S_R$ decreases. That is, as the difference between the sensitivity function $S(\theta)$ and the target sensitivity function $S_R$ decreases, the evaluation function $J(\theta)$ decreases. As the difference between the measured value Y and the set value R decreases, the evaluation function $J(\theta)$ decreases. As described above, this embodiment is based on the premise that the difference between the measured value Y and the set value R is significantly larger than zero. Accordingly, the control parameter θ is adjusted such that the difference between the sensitivity function $S(\theta)$ and the target sensitivity function $S_R$ decreases. Equation (7) means that the control parameter is optimally adjusted such that preferable attenuation characteristics which are defined by the target sensitivity function $S_R$ are acquired with the main frequency component of the measured value Y. The control parameter adjuster 168 sets the adjusted control parameter $\theta_0$ as a control parameter of a controller of the process in the control device 24. The controller calculates a manipulated variable on an input difference using the control parameter $\theta_0$.

Figure 5:
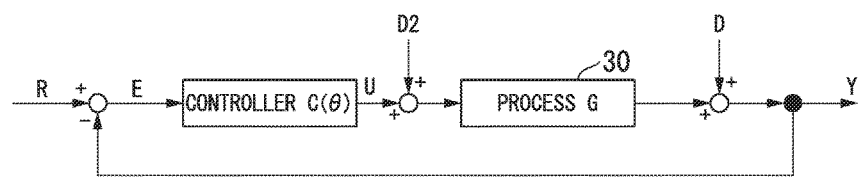
FIG. 5 is a block diagram showing another example of a control loop according to the embodiment.

In Fumiaki Uozumi, Osamu Kaneko and Shigeru Yamamoto, "Fictitious Reference Iterative Tuning of Disturbance Observers for Attenuation of the Effect of Periodic Unknown Exogenous Signals," 11th IFAC (International Federation of Automatic Control) International Workshop on Adaptation and Learning in Control and Signal Processing, Jul. 3-5, 2013 (hereinafter, referred to as "Non-Patent Document 1"), it has been proposed that optimization calculation is performed on the basis of the assumption that a disturbance D2 which is added to a manipulated variable U which is input from the controller to the process is used as the disturbance which is input to the control system as shown in FIG. 5. In this method, it is necessary to use an inverse system $G^{-1}$ of the transfer function G of the process to calculate a virtual disturbance $D2_{est}(\theta)$ corresponding to the virtual disturbance $D_{est}(\theta)$ of Equation (5). However, since $G^{-1}$ is not generally proper, that is, the numerator order of the transfer function is larger than the denominator order, it is not possible to calculate a response thereof. Introduction of a high pass filter has been proposed to avoid this problem, but a process of determining filter characteristics and the like are necessary and this the algorithm is complicated. Therefore, when it is assumed that a disturbance D2 is added to the manipulated variable U input to the process from the controller as shown in FIG. 5, the above-mentioned optimization calculation, that is, adjustment of the control parameter $\theta$, can be performed in consideration of addition of the disturbance D=G·D2 to the output value from the process as shown in FIG. 4 according to this embodiment. Accordingly, it is possible to effectively calculate the control parameter. Since the sensitivity function is also a transfer function from the set value R to a control difference E, calculation of the control parameter for optimizing the sensitivity function also means that tracking performance for the set value is defined and thus is effective for improvement in tracking performance. That is, an increase of a degree of attenuation in a low frequency band of the sensitivity function means that tracking performance is improved to track a change in the set value.

(Attenuation Factor Function)

An example of the attenuation factor function $S_d$ will be described below. When peak characteristics are provided as a main component of frequency characteristics of a measured value including a disturbance D or a main component of frequency characteristics of an initial sensitivity function $S(\theta_{ini})$, the target sensitivity function calculator 164 uses, for example, a product of four element functions $S_1(s)$, $S_2(s)$, $S_3(s)$, and $S_4(s)$ expressed by Equation (8) as the attenuation factor function $S_d$.

$$S_1(s) = \frac{1}{\frac{\alpha \cdot 10^r}{c}s+1} \quad S_2(s) = \frac{10^r}{c}s+1 \tag{8}$$

$$S_3(s) = \frac{10^{-r}}{c}s+1 \quad S_4(s) = \frac{1}{\frac{10^r}{\alpha \cdot c}s+1}$$

Figure 6:
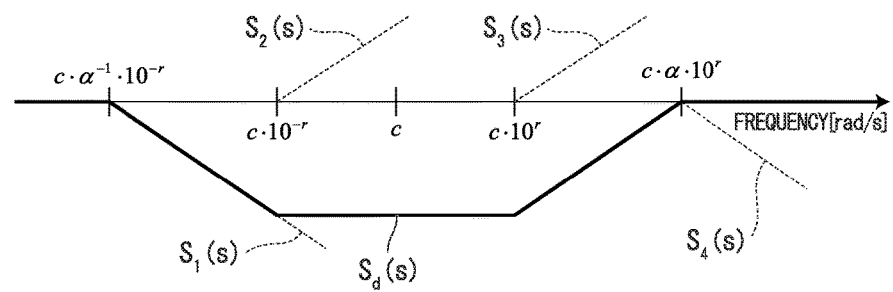
FIG. 6 is a conceptual diagram showing an example of an attenuation factor function according to the embodiment and element functions thereof.

In Equation (8), c and r denote a center frequency and a unilateral bandwidth, respectively, $\alpha$ is a parameter which is given on the basis of the unilateral bandwidth R and the attenuation factor M. Dependencies of the element functions $S_1(s)$, $S_2(s)$, $S_3(s)$, and $S_4(s)$ on a frequency s are shown in FIG. 6. The values of the element function $S_1(s)$ and the element function $S_4(s)$ decrease as the frequency in a frequency band higher than $c\cdot\alpha^{-1}\cdot10^{-r}$ and $c\cdot\alpha\cdot10^r$ increases. On the other hand, the values of the element function $S_2(s)$ and $S_3(s)$ increase as the frequency in a frequency band lower than $c\cdot10^{-r}$ and $c\cdot10^r$ increases. The attenuation factor function $S_d$ is expressed by Equation (9).

$$S_d(s) = S_1(s)S_2(s)S_3(s)S_4(s) = \frac{\left(\frac{10^r}{c}s+1\right)\left(\frac{10^{-r}}{c}s+1\right)}{\left(\frac{\alpha \cdot 10^r}{c}s+1\right)\left(\frac{10^{-r}}{\alpha \cdot c}s+1\right)} \tag{9}$$

Accordingly, the attenuation factor function $S_d(S)$ has attenuation characteristics shown in FIG. 6 in a frequency band between $c\cdot\alpha^{-1}\cdot10^{-r}$ and $c\cdot\alpha\cdot10^r$ with respect to the center frequency c. A gain R [no unit] is calculated as $10^{-M/20}$ from the attenuation factor M [unit: dB].

The condition of $\alpha$ that the attenuation factor function $S_d$ gives the attenuation factor R at the center frequency c satisfies Equation (10).

$$R^2 = |S_d(jc)|^2 = S_d(jc) \cdot S_d(-jc) = \frac{2 + 10^{2r} + 10^{-2r}}{2 + \alpha^2 10^{2r} + \alpha^{-2} 10^{-2r}} \tag{10}$$

In Equation (10), j denotes an imaginary unit. A quadratic equation for A is obtained from Equation (10) as expressed by Equation (11).

$$10^{2r} \cdot A^2 + \left(2 - \frac{2 + 10^{2r} + 10^{-2r}}{R^2}\right)A + 10^{-2r} = 0 \tag{11}$$

In Equation (11), A is $\alpha^2$. Accordingly, a satisfying Equation (11) is calculated by Equation (12).

$$A = \frac{-\left(2 - \frac{1 + 10^{2r} + 10^{-2r}}{R^2}\right) + \sqrt{\left(2 - \frac{1 + 10^{2r} + 10^{-2r}}{R^2}\right)^2 - 4}}{2 \cdot 10^{2r}}, \tag{12}$$

$$\alpha = \sqrt{A}.$$

Figure 7:
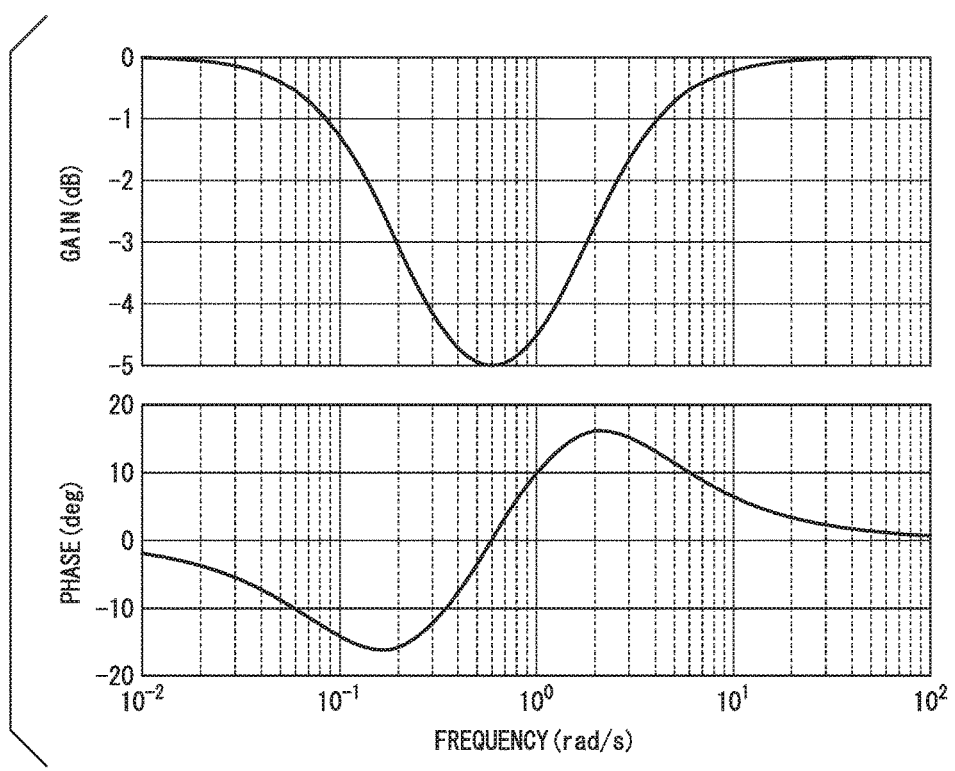
FIG. 7 is a diagram showing an example of an attenuation factor function according to the embodiment.

For example, when the center frequency c, the unilateral bandwidth r, and the attenuation factor M are 0.6 [rad/s], 0.3 [rad/s], and 5 [dB], respectively, $\alpha$ is 2.1057. A Bode diagram of the attenuation factor function $S_d$ which is given at this time is shown in FIG. 7. In FIG. 7, the horizontal axis represents the frequency. The vertical axis in the upper part and the vertical axis in the lower part represent the gain and the phase of the attenuation factor function $S_d$. As shown in FIG. 7, the gain at the center frequency c is −5 dB which is a minimum and the phase thereof is zero. In a frequency band lower than the center frequency c, the phase is less than zero. On the other hand, the phase has a positive value in a frequency band higher than the center frequency c. According to the attenuation factor function $S_d$, a higher attenuation factor is given for a frequency band having higher sensitivity to a disturbance D. Accordingly, the control parameter $\theta_0$ is determined such that a degree of attenuation for a disturbance D including a component of the frequency band increases.

On the other hand, when the main component is in a low frequency band, the target sensitivity function calculator 164 uses, for example, the product of two element functions $S_1(s)$ and $S_2(s)$ expressed by Equation (13) as the attenuation factor function $S_d$.

$$S_1(s) = R\left(\frac{1}{w_1}s + 1\right) S_2(s) = \frac{1}{\frac{R}{w_1}s + 1} \quad (13)$$

$$S_d = S_1(s)S_2(s) = \frac{R\left(\frac{1}{w_1}s + 1\right)}{\frac{R}{w_1}s + 1}$$

According to the attenuation factor function $S_d$ expressed by Equation (13), the attenuation factor at a frequency (for example, a frequency closest to a frequency of zero [rad/s])) sufficiently lower than the start frequency $w_1$ is approximated to M. The attenuation factor at a frequency (for example, a frequency closest to a frequency of ∞ [rad/s]) sufficiently higher than the start frequency $w_1$ becomes zero.

Figure 8:
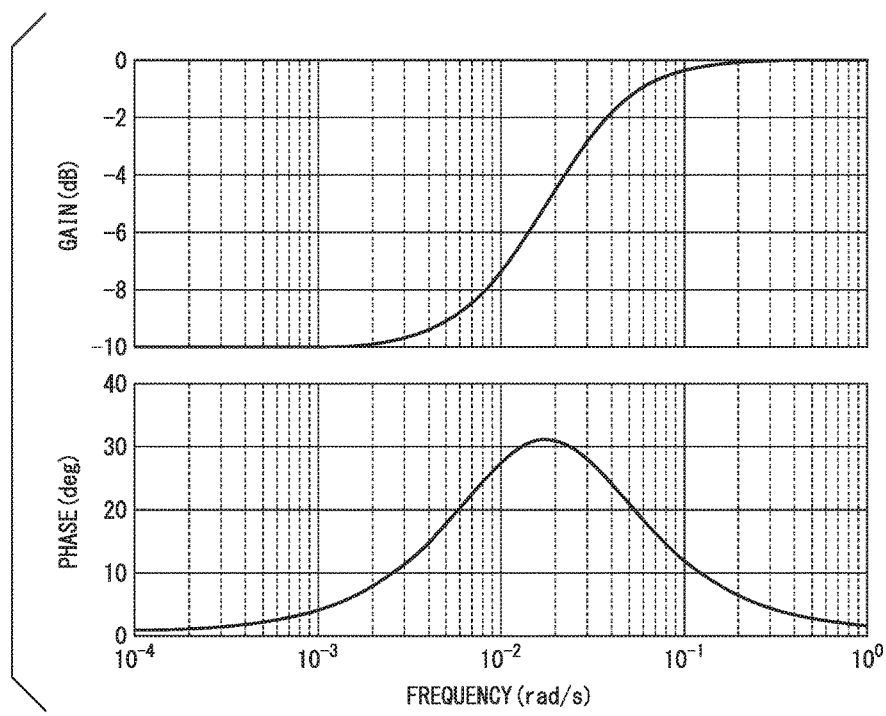
FIG. 8 is a diagram showing another example of an attenuation factor function according to the embodiment.

For example, a Bode diagram of the attenuation factor function $S_d$ when the start frequency $w_1$ and the attenuation factor M are given as 0.01 [rad/s] and 10 [dB] is shown in FIG. 8. As shown in FIG. 8, the gain increases as the frequency increases. When the frequency approaches zero [rad/s], the gain gradually approaches −10 [dB]. When the frequency approaches ∞, the gain gradually approaches zero [dB]. The phase gradually approaches zero [deg] as the frequency approaches zero [rad/s] or ∞ [rad/s], but is about 31 [deg] which is a maximum when the frequency is 0.02 [rad/s]. According to this attenuation factor function $S_d$, a high attenuation factor is given for a low frequency band. Accordingly, the control parameter $\theta_0$ is determined such that a degree of attenuation for a disturbance D including a component of a low frequency band increases.

(Method of Calculating Control Parameter)

An example of a method of calculating the control parameter $\theta_0$ according to this embodiment will be described below.

Figure 9:
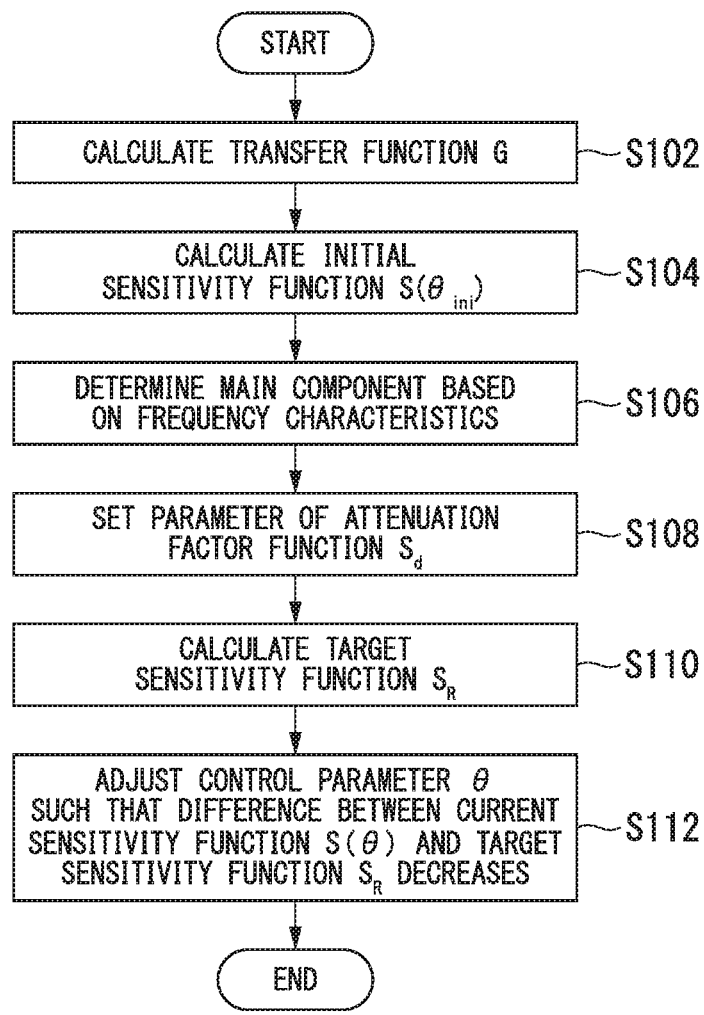
FIG. 9 is a flowchart showing an example of a method of calculating a control parameter according to the embodiment.

FIG. 9 is a flowchart showing an example of the method of calculating a control parameter $\theta_0$ according to this embodiment.

(Step S102) The process identifier 162 defines a transfer function G from a model output value $y_{model}(t)$ which is acquired by applying an input value u(t) input to the process and the transfer function G such that a square norm of an error v(t) of a measured value $y_{meas}(t)$ output from the process decreases. Thereafter, the process of Step S104 is performed.

(Step S104) The target function calculator 164 defines an initial sensitivity function $S(\theta_{ini})$ on the basis of the transfer function G of the process and an initial transfer function $C(\theta_{ini})$ of a controller. $\theta_{ini}$ is an initial value of the control parameter. Thereafter, the process of Step S106 is performed.

(Step S106) The frequency analyzer 166 analyzes frequency characteristics of a measured value Y output from the process or frequency characteristics of the initial sensitivity function $S(\theta_{ini})$. The target sensitivity function calculator 164 determines whether the frequency characteristics have peak characteristics as a main component and whether the main component of the frequency characteristics is in a low frequency band when the frequency characteristics do not have peak characteristics. Thereafter, the process of Step S108 is performed.

(Step S108) The target sensitivity function calculator 164 sets a parameter of the attenuation factor function $S_d$ on the basis of the determined main component. When the frequency characteristics have peak characteristics as a main component, the target sensitivity function calculator 164 sets the center frequency c of a peak of the gain, the unilateral bandwidth r, and the attenuation factor M. When the main component of the frequency characteristics is in a low frequency band, the target sensitivity function calculator 164 sets the start frequency $w_1$ and the attenuation factor M.

(Step S110) The target sensitivity function calculator 164 calculates a target sensitivity function $S_R$ by multiplying the initial sensitivity function $S(\theta_{ini})$ by the attenuation factor function $S_d$ given with the set parameter. Thereafter, the process of Step S112 is performed.

(Step S112) The control parameter adjuster 168 adjusts the control parameter θ such that a magnitude of a difference between the current sensitivity function S(θ) given with the control parameter θ and the target sensitivity function $S_R$ decreases. Thereafter, the process flow shown in FIG. 9 is ended.

(FRIT Algorithm)

A FRIT algorithm will be described below as an example of a method of adjusting a control parameter θ. The FRIT algorithm is a method of updating a control parameter offline such that a square norm of an error between an output value based on a target response transfer function and an initial output value decreases when the target response transfer function, an initial control parameter, an initial set value, and an initial output value of a certain control target are given.

In this embodiment, the control parameter adjuster 168 uses a target sensitivity function $S_R$ and an initial value $\theta_{ini}$ of the control parameter before adjustment as the target response transfer function and the initial control parameter. Process data of a set value R is applied as the initial set value and process data of a measured value Y is applied as the initial output value.

The control parameter adjuster 168 sequentially updates the control parameter θ (vector) using a Gauss-Newton method such that an evaluation function J(θ) is minimized. According to the Gauss-Newton method, a change of the control parameter is calculated by multiplying a product of a derivative J'(θ) (vector) of the evaluation function J(θ) with respect to the control parameter and an inverse matrix J''(θ)−1 of a Hesse matrix J''(θ) of the evaluation function J(θ) by a predetermined step size γ. The Hesse matrix is a matrix having double partial derivatives of element values of the control parameter of J''(θ) as elements. The control parameter adjuster 168 determines whether a change of the evaluation function δJ(θ), that is, a difference δJ(θ') between the evaluation function J(θ') based on the updated control parameter θ' and the evaluation function J(θ) based on the non-updated control parameter θ, is less than a predetermined difference threshold value ε. When it is determined that the difference δJ(θ') is less than the threshold value ε, the control parameter adjuster 168 stops the process of adjusting the control parameter. When it is determined that the difference δJ(θ') is equal to or greater than the threshold value the control parameter adjuster 168 repeatedly performs the process of adjusting the control parameter.

According to this method, when the target sensitivity function $S_R$, the initial control parameter $\theta_{ini}$, the set value R, and the measured value Y are acquired, an optimal adjusted value $\theta_0$ of the control parameter is calculated offline. Accordingly, a plurality of times of online test do not need to be performed for updating the control parameter θ. The FRIT algorithm is described in detail, for example, in Non-Patent Document 1.

(Calculation Example of Control Parameter)

A calculation example of the control parameter θ will be described below. In a first example, it is assumed that a transfer function G of a process and an initial transfer function $C(\theta_{ini})$ of a controller are given by Equations (14) and (15), respectively.

$$G = \exp(-2s) \cdot \frac{0.78}{1 + 12.8 \cdot s} \quad (14)$$

$$C(\theta_{ini}) = 5 \cdot \left(1 + \frac{1}{30 \cdot s}\right) \quad (15)$$

Figure 10:
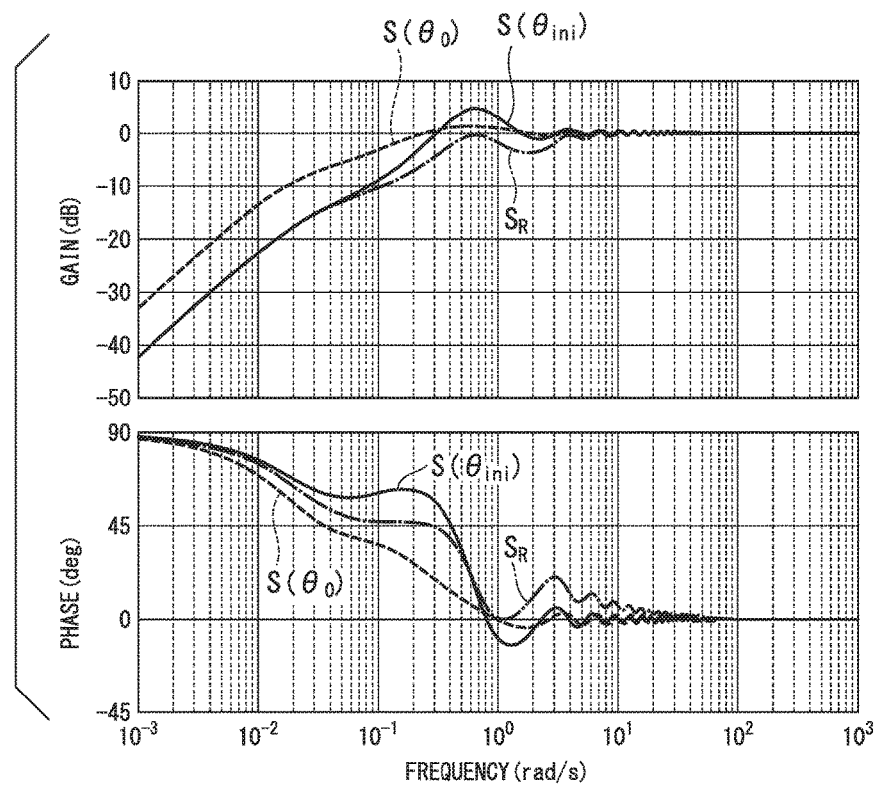
FIG. 10 is a diagram showing an example of a sensitivity function according to the embodiment.

The transfer function expressed by Equation (14) denotes that the process is a primary delay system to which a waste time is added. The initial transfer function $C(\theta_{ini})$ expressed by Equation (15) denotes that the control parameter $\theta=[K_P, K_I, K_D]$ of PID control is [5, 30, 0]. At this time, the gain of the initial sensitivity function $S(\theta_{ini})$ has a peak at a frequency of 0.6 [rad/s] as shown in FIG. 10. A degree of attenuation and a unilateral bandwidth at the frequency are 5 [dB] and 0.3 [rad/s], respectively. Therefore, as the parameter of the attenuation factor function $S_d$, the center frequency c and the unilateral bandwidth r are given as 0.6 [rad/s] and 0.3 [rad/s], respectively. The attenuation factor M is set to 5.0 [dB]. The target sensitivity function $S_R$ is set such that the gain is zero [dB] at a frequency of 0.6 [rad/s] and the gain is not greater than zero [dB] over the whole frequency band. The control parameter $\theta_O$ adjusted by the control parameter adjuster 168 under this condition is [1.708, 29.73, 0.370]. Accordingly, the transfer function $C(\theta_O)$ of the controller is given by Equation (16).

$$C(\theta_0) = 1.708 \cdot \left(1 + \frac{1}{29.73 \cdot s} + \frac{0.37 \cdot s}{1 + 0.37 \cdot s / 10}\right) \quad (16)$$

In the sensitivity function $S(\theta_O)$ acquired with the control parameter $\theta_O$, the peak of the gain at the frequency of 0.6 [rad/s] is reduced as shown in FIG. 10. The gain at the frequency of 0.6 [rad/s] is about 1 [dB] which is less 4 [dB] than before processing. Here, the gain in a low frequency band increases. Particularly, the peak of the gain of the sensitivity function $S(\theta_O)$ is smoothed. In a frequency band lower than a frequency of 0.3 [rad/s], the gain is less than 0 [dB]. Accordingly, attenuation characteristics for a disturbance D as a whole of the system are improved.

In a second example, it is assumed that a transfer function G of a process and an initial transfer function $C(\theta_{ini})$ of a controller are given by Equations (17) and (18), respectively.

$$G = \exp(-s) \cdot \frac{0.0733}{1 + 17.57 \cdot s} \quad (17)$$

$$C(\theta_{ini}) = 6 \cdot \left(1 + \frac{1}{40 \cdot s}\right) \quad (18)$$

Figure 11:
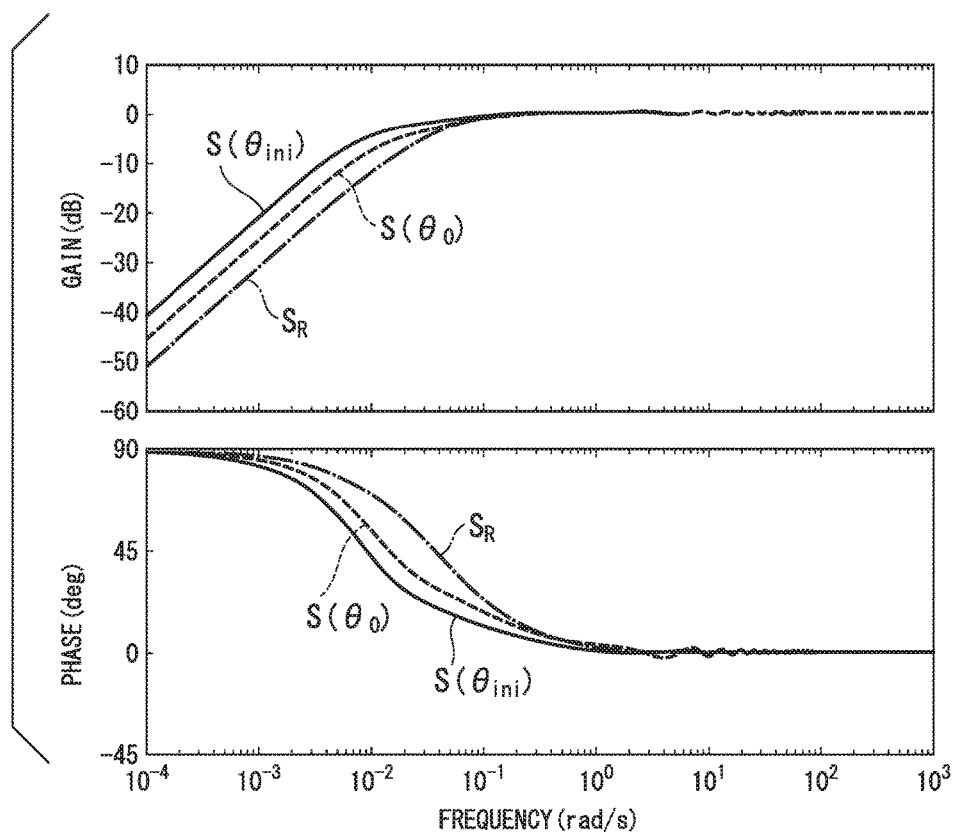
FIG. 11 is a diagram showing another example of a sensitivity function according to the embodiment.
Figure 12:
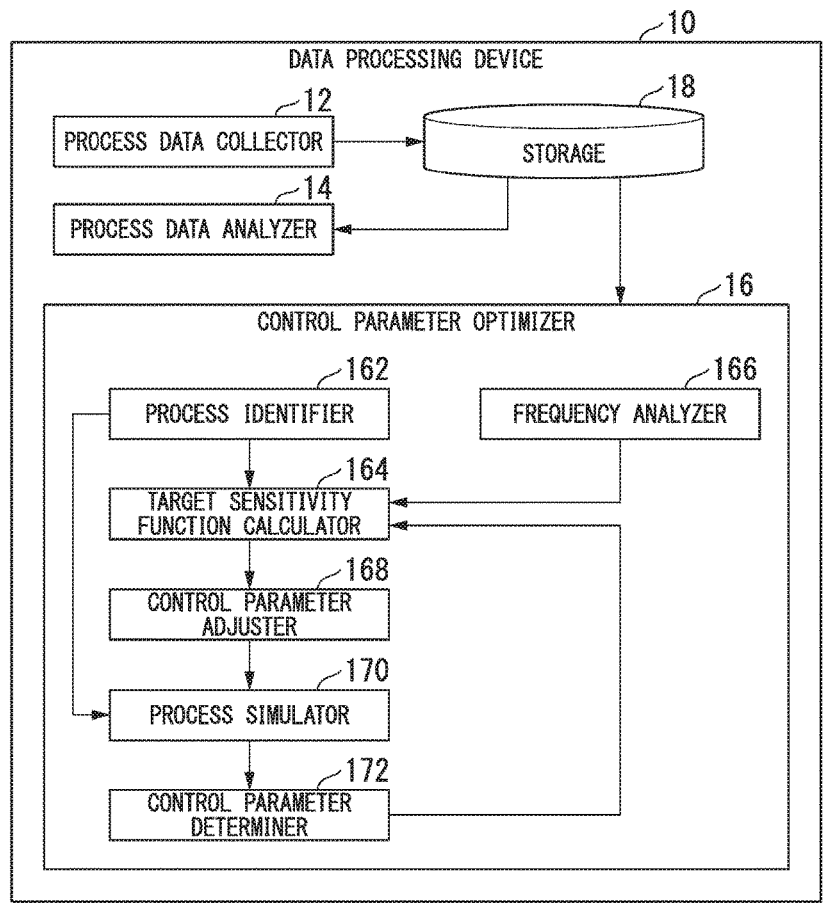
FIG. 12 is a block diagram showing an example of a configuration of a data processing device according to a modified example of the embodiment.

In the example expressed by Equation (18), the control parameter $\theta$ of the controller is $[KP, K_I, K_D]=[6, 40, 0]$. At this time, as shown in FIG. 11, the gain of the initial sensitivity function $S(\theta_{ini})$ does not have a peak and the gain increases monotonously as the frequency increases. However, the gain of a component in a low frequency band is relatively high. At a frequency of 0.01 [rad/s], the gain is −3 [dB]. Therefore, the start frequency w1 as a parameter of the attenuation factor function $S_d$ is given as 0.01 [rad/s]. The attenuation factor M is set to 10 [dB]. The target sensitivity function $S_R$ is set such that the gain is −12 [dB] at the frequency of 0.01 [rad/s] and the gain is not greater than zero [dB] over the whole frequency band. The control parameter $\theta_O$ adjusted by the control parameter adjuster 168 under this condition is [10.03, 39.20, 1.056]. Accordingly, the transfer function $C(\theta_O)$ of the controller is given by Equation (19).

$$C(\theta_0) = 10.03 \cdot \left(1 + \frac{1}{39.2 \cdot s} + \frac{1.056 \cdot s}{1 + 1.056 \cdot s / 10}\right) \quad (19)$$

In the sensitivity function $S(\theta_O)$ acquired with the control parameter $\theta_O$, the gain decreases significantly in a low frequency band, particularly, in a frequency band equal to or lower than the start frequency 0.01 [rad/s], as shown in FIG. 11. The gain at the start frequency 0.01 [rad/s] is about −8 [dB] which is less than 5 [dB] than before processing. This calculation example represents that attenuation characteristics for a disturbance D as a whole of the system are improved.

As described above, the data processing device 10 according to this embodiment includes the process identifier 162, the target sensitivity function calculator 164, the frequency analyzer 166, and the control parameter adjuster 168. The process identifier 162 calculates a transfer function of a process on the basis of an output value from the process as a control target and a manipulated variable on the process. The frequency analyzer 166 analyzes frequency characteristics of a measured value from the process or frequency characteristics of an initial sensitivity function which is acquired from the transfer function of the process and the initial control parameter. The target sensitivity function calculator 164 defines a target sensitivity function on the basis of the initial sensitivity function and the frequency characteristics. The control parameter adjuster 168 adjusts the control parameter such that a difference between the sensitivity function and the target sensitivity function decreases.

According to this configuration, without applying a load such as a step response test to an operation of the process as a control target, the control parameter is obtained such that the sensitivity function based on the control parameter approaches the target sensitivity function defined on the basis of the frequency characteristics using real-time data acquired during operation. When the target sensitivity function is defined such that the measured value from the process or the main component of the initial sensitivity function is attenuated in a frequency band in which a main component is given, the control parameter is adjusted such that the sensitivity function in the frequency band is attenuated. Accordingly, attenuation characteristics for a disturbance as a whole of the system are improved.

The frequency analyzer 166 specifies a frequency band in which the gain of the initial sensitivity function is greater than the gains in the other frequency bands, and the target sensitivity function calculator 164 defines the target sensitivity function such that the gain in the specified frequency band is less than the gain of the initial sensitivity function.

According to this configuration, when the gain of the frequency characteristics of the measured value has a peak, the target sensitivity function is defined such that the gain in the frequency band including the peak decreases. Accordingly, the control parameter is adjusted such that the sensitivity function in the frequency band which is a main component of the frequency characteristics of the measured value is attenuated.

The target sensitivity function calculator 164 defines an attenuation factor function indicating an attenuation factor for each frequency on the basis of the center frequency of the frequency band in which the gain is attenuated, the attenuation factor of the gain, and the bandwidth of the frequency band, and defines the target sensitivity function by multiplying the attenuation factor function by the initial sensitivity function.

According to this configuration, the frequency characteristics of the attenuation factor with respect to the gain of the sensitivity function are quantitatively instructed using a few parameters such as the center frequency, the attenuation factor, and the bandwidth. Accordingly, it is possible to reduce a calculation load which is applied to definition of a target sensitivity function and adjustment of a control parameter.

When the gain in a low frequency band lower than a predetermined frequency is greater than a predetermined gain, the target sensitivity function calculator 164 defines the target sensitivity function such that the gain in the low frequency band is less than the gain of the initial sensitivity function.

According to this configuration, when a main component of frequency characteristics of a measured value is in a low frequency band, the target sensitivity function is defined such that the gain decreases in the low frequency band. Accordingly, the control parameter is adjusted such that the sensitivity function in the low frequency band is attenuated.

The target sensitivity function calculator 164 defines an attenuation factor function indicating an attenuation factor for each frequency on the basis of the attenuation factor of the gain in the low frequency band and the start frequency which is a predetermined frequency, and defines the target sensitivity function by multiplying the attenuation factor function by the initial sensitivity function.

According to this configuration, the frequency characteristics of the attenuation factor with respect to the gain of the sensitivity function are quantitatively instructed using a few parameters such as the attenuation factor and the start frequency. Accordingly, it is possible to reduce a calculation load which is applied to definition of a target sensitivity function and adjustment of a control parameter.

(Modified Example)

While an embodiment of the invention has been described above with reference to the drawings, a specific configuration of the invention is not limited to the above description but can be modified in various designs without departing from the gist of the invention.

For example, the data processing device 10 may be configured to further include a process simulator 170 and a control parameter determiner 172.

Transfer function information indicating a parameter of an identified transfer function G from the process identifier 162 and control parameter information indicating an initial control parameter $\theta_{ini}$ and an adjusted control parameter $\theta_O$ from the control parameter adjuster 168 are input to the process simulator 170. In this modified example, the control parameter adjuster 168 may not transmit the control parameter information indicating the adjusted control parameter $\theta_O$ to the control device 24 (FIG. 1). The process simulator 170 may set another control parameter $\theta^*$ other than the initial control parameter $\theta_{ini}$ and the adjusted control parameter $\theta_O$. The control parameter $\theta^*$ may be, for example, a control parameter that gives control characteristics which are an average of the initial transfer function $C(\theta_{ini})$ of a controller and the adjusted transfer function $C(\theta_O)$ of the controller.

The process simulator 170 sets a transfer function $C(\theta)$ of a controller given with some control parameters $\theta$ and a transfer function G of a process. The process simulator 170 calculates a manipulated variable U on a difference between a set value R and a measured value Y at each time point using the transfer function $C(\theta)$ of the controller, and calculates the measured value Y at that time point additionally using the transfer function G of the process. The process simulator 170 may display graph data indicating a time series of the calculated manipulated variable U and the calculated measured value Y on a display unit (not shown).

The control parameter determiner 172 may determine one of the control parameters set by the process simulator 170 as a control parameter which is instructed using an operation signal input from an operation input unit (not shown). The control parameter determiner 172 transmits control parameter information indicating the determined control parameters to the control device 24 (FIG. 1) via the monitoring device 22 (FIG. 1). Accordingly, a monitoring engineer can compare and confirm temporal variations of the manipulated variable U and the measured value Y which are calculated for each control parameter and can determine which of the control parameters to use for control.

The control parameter optimizer 16 may repeatedly perform the processes of Steps S202 to S210 which will be described below a predetermined number of times.

(Step S202) The target sensitivity function calculator 164 updates a parameter of a attenuation factor function $S_d$. When the frequency characteristics of the output value or the frequency characteristics of the initial sensitivity function $S(\theta_{ini})$ have peak characteristics as a main component, a parameter to be updated may be one of the center frequency c, the unilateral bandwidth r, and the attenuation factor M or may be an arbitrary combination thereof. When the main component of the frequency characteristics of the output value or the frequency characteristics of the initial sensitivity function $S(\theta_{ini})$ is in a low frequency band, the parameter to be updated may be one or both of the start frequency $w_1$ and the attenuation factor M.

Thereafter, the process of Step S204 is performed.

(Step S204) The target sensitivity function calculator 164 calculates a target sensitivity function $S_R$ from the attenuation factor function $S_d$ given with the updated parameter and the initial sensitivity function $S(\theta_{ini})$. Thereafter, the process of Step S206 is performed.

(Step S206) Then, the control parameter adjuster 168 adjusts the control parameter $\theta$ such that the magnitude of the difference between the calculated target sensitivity function $S_R$ and the sensitivity function $S(\theta)$ given with the control parameter $\theta$ decreases. Accordingly, the control parameter $\theta_O$ is obtained by retuning the parameter of the updated attenuation factor function $S_d$. Thereafter, the process of Step S208 is performed.

(Step S208) The process simulator 170 calculates a manipulated variable U on a difference between the set value R and the measured value Y at each time point using the transfer function $C(\theta_O)$ of the controller which is given with the retuned control parameter $\theta_O$, and calculates the measured value Y at that time point additionally using the transfer function G of the process. Thereafter, the process of Step S210 is performed.

(Step S210) The process simulator 170 displays graph data indicating a time series of the calculated manipulated variable U and the calculated measured value Y on a display unit (not shown).

Thereafter, the control parameter optimizer 16 may select the control parameter instructed by an operation signal input from the operation input unit (not shown) among the control parameters which are acquired in the process of Step S206.

The control parameter optimizer 16 according to the above-mentioned modified example includes the process simulator 170 and the control parameter determiner 172. Accordingly, confirmation of the manipulated variable and the measured value which are acquired by calculation (simulation) and recalculation of the control parameters are repeatedly performed. The control parameters can be calculated without applying a load such as a step response test to operation of a process. Attenuation characteristics for a disturbance are improved more with the calculated control parameter than the non-adjusted control parameter.

The control parameter optimizer 16 may repeatedly perform the processes of Steps S202 to S206 and store the adjusted control parameter $\theta_0$ and a predetermined index value every repetition of the processes. The control parameter optimizer 16 may select a control parameter $\theta_0$ that gives a smallest index value among stored index values and transmit control parameter information indicating the selected control parameter $\theta_0$ to the control device 24 via the monitoring, device 22. One of an evaluation function $J(\theta_0)$, a maximum value of power of an output value in frequencies, and a maximum value of a gain of a sensitivity function $S(\theta)$ in frequencies may be used as the index value.

The orders of a transfer function G of a process, a transfer function C of a controller, and a attenuation factor function $S_d$ are not limited to the above-mentioned orders. Such orders may be lower than the above-mentioned orders or may be higher than the above-mentioned orders.

What is claimed is:

1. A data processing device comprising:
   a first definer configured to define a transfer function of a process which is a control target on the basis of an output value from the process and a manipulated variable of the process;
   an analyzer configured to analyze frequency characteristics of the output value from the process;
   a second definer configured to define a target sensitivity function on the basis of a sensitivity function, a first frequency band included in the frequency characteristics, and a predetermined attenuation factor, the sensitivity function being defined based on the transfer function of the process and at least one control parameter of a controller for controlling the process; and
   an adjuster configured to adjust the at least one control parameter to decrease a difference between the sensitivity function and the target sensitivity function.

2. The data processing device according to claim 1, wherein
   the second definer is configured to:
   specify a frequency band in which a gain is greater than gains in other frequency bands as the first frequency band; and
   define the target sensitivity function, the gain of the target sensitivity function in the specified first frequency band being less than the gain of the sensitivity function.

3. The data processing device according to claim 2, wherein
   the second definer is configured to:
   define an attenuation factor function indicating an attenuation factor of the gain for each frequency on the basis of a center frequency of the first frequency band in which the gain is attenuated, an attenuation factor of the gain at the center frequency, and a bandwidth of the first frequency band; and
   multiply the sensitivity function by the attenuation factor function to define the target sensitivity function.

4. The data processing device according to claim 2, wherein
   the second definer is configured to define the target sensitivity function, the gain of the target sensitivity function in the specified first frequency band being less than the gain of the sensitivity function, when the second definer determines that a center frequency of the specified first frequency band is higher than a predetermined frequency.

5. The data processing device according to claim 1, wherein
   the second definer is configured to define the target sensitivity function, the gain of the target sensitivity function in a low frequency band being less than the gain of the sensitivity function, the low frequency band being lower than a predetermined second frequency, when the gain in the low frequency band is greater than a predetermined gain.

6. The data processing device according to claim 5, wherein
   the second definer is configured to:
   define an attenuation factor function indicating an attenuation factor of the gain for each frequency on the basis of the gain at 0 [rad/s] and a start frequency which is the predetermined second frequency; and
   multiply the sensitivity function by the attenuation factor function to define the target sensitivity function.

7. A data processing device comprising:
   a first definer configured to define a transfer function of a process which is a control target on the basis of an output value from the process and a manipulated variable of the process;
   an analyzer configured to analyze frequency characteristics of a sensitivity function defined based on a transfer function of the process and at least one control parameter of a controller for controlling the process;
   a second definer configured to define a target sensitivity function on the basis of the sensitivity function, a first frequency band included in the frequency characteristics, and a predetermined attenuation factor; and
   an adjuster configured to adjust the at least one control parameter to decrease a difference between the sensitivity function and the target sensitivity function.

8. A data processing method comprising:
   defining a transfer function of a process which is a control target on the basis of an output value from the process and a manipulated variable of the process;
   analyzing frequency characteristics of the output value from the process or frequency characteristics of a sensitivity function defined based on the transfer function of the process and at least one control parameter of a controller for controlling the process;
   defining a target sensitivity function on the basis of the sensitivity function, a frequency band included in the frequency characteristics, and a predetermined attenuation factor; and
   adjusting the at least one control parameter to decrease a difference between the sensitivity function and the target sensitivity function.

9. The data processing method according to claim 8, wherein
   defining the target sensitivity function comprises:
   specifying a frequency band in which a gain is greater than gains in other frequency bands as the first frequency band; and defining the target sensitivity function, the gain of the target sensitivity function in the specified first frequency band being less than the gain of the sensitivity function.

10. The data processing method according to claim 9, wherein defining the target sensitivity function comprises:

defining an attenuation factor function indicating an attenuation factor of the gain for each frequency on the basis of a center frequency of the first frequency band in which the gain is attenuated, an attenuation factor of the gain at the center frequency, and a bandwidth of the first frequency band; and multiplying the sensitivity function by the attenuation factor function to define the target sensitivity function.

11. The data processing method according to claim 9, wherein defining the target sensitivity function comprises defining the target sensitivity function, the gain of the target sensitivity function in the specified first frequency band being less than the gain of the sensitivity function, when the second definer determines that a center frequency of the specified first frequency band is higher than a predetermined frequency.

12. The data processing method according to claim 8, wherein defining the target sensitivity function comprises defining sensitivity function, the gain of the target sensitivity function in a low frequency band being less than the gain of the sensitivity function, the low frequency band being lower than a predetermined second frequency, when the gain in the low frequency band is greater than a predetermined gain.

13. The data processing method according to claim 12, wherein defining the target sensitivity function comprises:

defining an attenuation factor function indicating an attenuation factor of the gain for each frequency on the basis of the gain at 0 [rad/s] and a start frequency which is the predetermined second frequency; and multiplying the sensitivity function by the attenuation factor function to define the target sensitivity function.

* * * * *